No. 702,788. Patented June 17, 1902.
S. GECZYNSKI.
CLOTH CUTTER.
(Application filed Feb. 10, 1902.)
(No Model.)
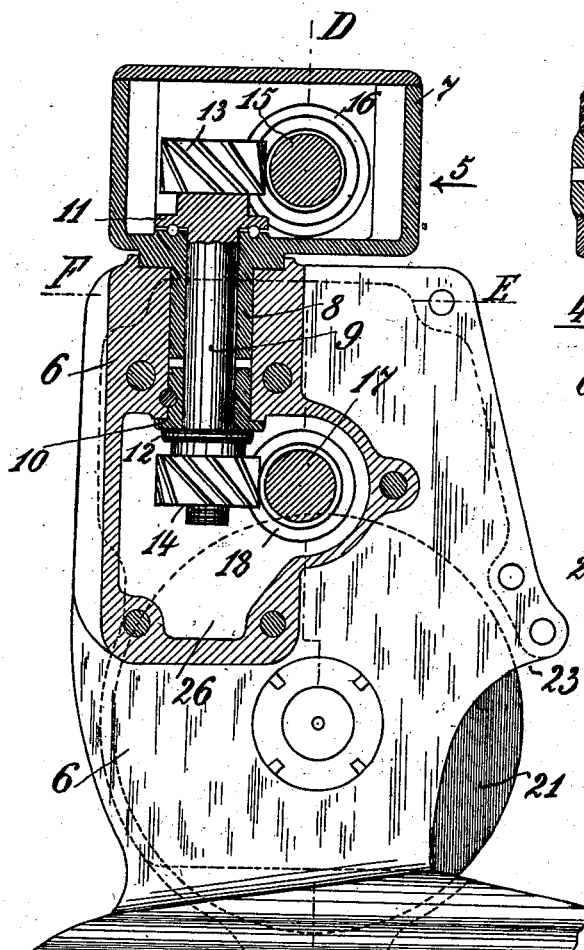
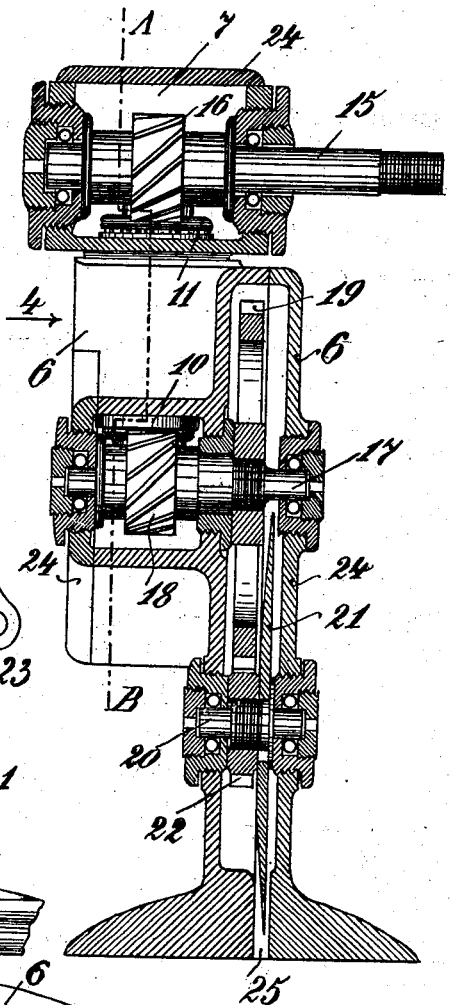
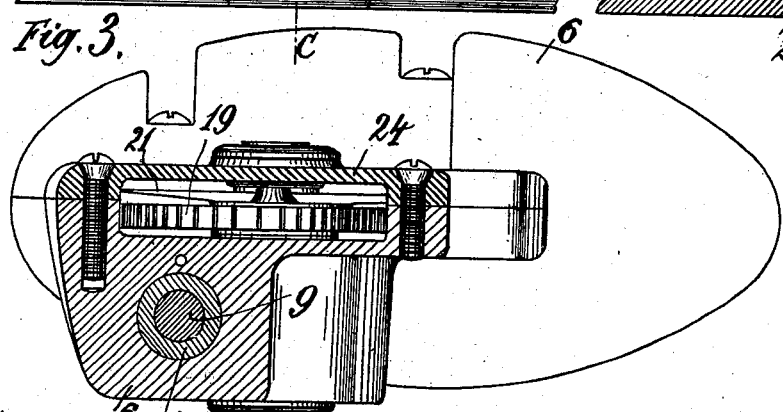
Witnesses:
H. E. Manning.
H. H. Simms.
Inventor:
Samuel Geczynski
By Knight Bros.
Attys.

UNITED STATES PATENT OFFICE.

SAMUEL GECZYNSKI, OF BERLIN, GERMANY.

CLOTH-CUTTER.

SPECIFICATION forming part of Letters Patent No. 702,788, dated June 17, 1902.

Application filed February 10, 1902. Serial No. 93,430. (No model.)

*To all whom it may concern:*

Be it known that I, SAMUEL GECZYNSKI, civil engineer, a subject of the Emperor of Russia, residing at No. 77 Bernauerstrasse, Berlin, Kingdom of Prussia, and Empire of Germany, have invented certain new and useful Improvements in Machines with Circular Knives for Cutting Textile and other Fabrics, whereof the following is a specification.

This invention relates to machines for cutting textile and other fabrics; and it has for its object to improve upon the construction and the operation of machines of this class now in use which employ a rotary cutting-knife.

The invention consists of certain parts and combinations of parts, which will be hereinafter fully described, and pointed out in the appended claims.

Referring to the drawings, Figure 1 shows the improved machine in longitudinal section on the line A B looking in the direction of arrow 4, Fig. 2. Fig. 2 is a longitudinal section on the line C D looking in the direction of arrow 5, Fig. 1. Fig. 3 is a section on the line E F of Fig. 1.

The invention comprises a lower casing 6 and an upper casing 7, provided with a downwardly-extending hollow pivot 8, which is rotatably mounted in an opening in the lower casing 6. A vertical shaft 9 is supported within the hollow pivot 8 and the bushing 10, which is also mounted in the opening in the lower casing 6, and said shaft 9 is held against axial movement within the hollow pivot and the bushing by flanges 11 and 12.

Upon the ends of the shaft 9 are secured worm-wheels 13 and 14, the one upon the upper end meshing with a worm-wheel 16 upon a driving-shaft 15, mounted in the upper casing 7, and the worm-wheel 14 upon the lower end of the shaft 9 meshing with a worm-wheel 18 upon a shaft 17, mounted in the lower casing 6. It will thus be seen that the upper casing is adapted to be rotated upon the lower casing, so that power may be applied to the shaft 15 from any position.

Upon the shaft 17 is secured a large spur-wheel 19, which meshes with a small spur-wheel 22 upon the shaft 20, which shaft carries the rotary knife or cutter 21, the upper casing being cut away at 23, so that the same may be exposed for use.

Both of the casings 6 and 7 may be provided with removable covers 24 to render the parts within said casings accessible.

The machine is driven by a flexible shaft or any other suitable means.

Furthermore, when the driving-shaft 15 is slowly rotated it will be clear that the circular cutter 21 will rapidly rotate, as a result of the ratio existing between the wheels 19 and 22, without, however, causing by this speed of the cutter-shaft the disturbing vibrations, as when the driving-shaft 15 itself is rotated at a greater speed.

To obviate lubricating-oil flowing from the bearings of the shafts 15, 9, and 17 into the casing 6, the said casing is so shaped that it forms a kind of container 26, in which such oil may collect.

What I claim is—

1. In a machine of the class described, the combination of a lower casing, a cutter mounted therein, an upper casing rotatably mounted upon the lower casing, a driving-shaft mounted in the upper casing, and connecting mechanism between the driving-shaft and the cutter.

2. The combination of a lower casing, an upper casing, a driving-shaft mounted in the upper casing, a shaft 17, mounted in the lower casing, a vertical shaft connecting the driving-shaft and the shaft 17, a shaft 20, a cutter upon the shaft 20, and gearing connecting the shaft 17 and the shaft 20.

3. The combination of a lower casing provided with an opening, an upper casing mounted upon the lower casing and provided with a downwardly-extending hollow pivot, which projects into the opening in the lower casing, a vertical shaft mounted within the hollow pivot, a driving-shaft connecting with the upper end of the vertical shaft, a cutter mounted in the lower casing, and connections between the vertical shaft and the cutter.

4. The combination of a lower casing, provided with an opening, an upper casing mounted upon the lower casing, and provided with a downwardly-extending hollow pivot, a vertical shaft mounted within the hollow pivot, a bushing also secured within the opening of the lower casing around the vertical shaft, a driving-shaft mounted within the upper casing and connected to the vertical shaft, a shaft 17 mounted in the lower casing and connected to the vertical shaft, a spur-wheel carried by the shaft 17, a shaft 20, a spur-wheel smaller than the one upon the shaft 17, mounted upon the shaft 20, and a cutter also mounted upon the shaft 20.

In witness whereof I have hereunto set my hand in presence of two witnesses.

SAMUEL GECZYNSKI.

Witnesses:
   WOLDEMAR HAUPT,
   HENRY HASPER.